United States Patent
Han

(10) Patent No.: US 9,479,684 B2
(45) Date of Patent: Oct. 25, 2016

(54) CAMERA MODULE HAVING A HOUSING WITH A METAL LAYER

(75) Inventor: Kwang Joon Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/345,318

(22) PCT Filed: Sep. 14, 2012

(86) PCT No.: PCT/KR2012/007357
§ 371 (c)(1),
(2), (4) Date: Mar. 17, 2014

(87) PCT Pub. No.: WO2013/039343
PCT Pub. Date: Mar. 21, 2013

(65) Prior Publication Data
US 2014/0340574 A1    Nov. 20, 2014

(30) Foreign Application Priority Data

Sep. 16, 2011    (KR) .................. 10-2011-0093581

(51) Int. Cl.
| | | |
|---|---|---|
| G03B 13/00 | (2006.01) | |
| H04N 3/14 | (2006.01) | |
| H04N 5/225 | (2006.01) | |
| G03B 17/02 | (2006.01) | |
| G03B 13/36 | (2006.01) | |

(52) U.S. Cl.
CPC ............ H04N 5/2254 (2013.01); G03B 13/36 (2013.01); G03B 17/02 (2013.01); H04N 5/2257 (2013.01); G03B 2205/0053 (2013.01)

(58) Field of Classification Search
CPC .................. H04N 5/2251–5/2257; H04N 2201/02454–2201/02483

USPC .................................. 348/373–375
See application file for complete search history.

(56) References Cited

U.S. PATENT DOCUMENTS

| | | |
|---|---|---|
| 2004/0159920 A1 | 8/2004 | Omori |
| 2006/0038250 A1 | 2/2006 | Omori |
| 2010/0157141 A1* | 6/2010 | Ouyang ................. 348/371 |
| 2011/0134303 A1* | 6/2011 | Jung et al. ............ 348/340 |
| 2011/0221956 A1* | 9/2011 | Sekine et al. ......... 348/374 |
| 2012/0200764 A1* | 8/2012 | Afshari et al. ........ 348/345 |
| 2012/0315953 A1* | 12/2012 | Du et al. .............. 455/556.1 |

FOREIGN PATENT DOCUMENTS

| | | |
|---|---|---|
| CN | 101051635 A | 10/2007 |
| CN | 101750849 A | 6/2010 |
| JP | 2011-066560 A | 6/2009 |

(Continued)

OTHER PUBLICATIONS

International Search Report in International Application No. PCT/KR2012/007357, filed Sep. 14, 2012.

(Continued)

*Primary Examiner* — Sinh Tran
*Assistant Examiner* — Selam T Gebriel
(74) *Attorney, Agent, or Firm* — Saliwanchik, Lloyd & Eisenschenk

(57) ABSTRACT

The present invention relates to a camera module, the camera module including a PCB (Printed Circuit Board) mounted with an image sensor, a housing configured to protect the image sensor and mounted therein with camera constituent parts, and plural pieces of lenses mounted on the housing, wherein a surface of the housing is metalized.

14 Claims, 3 Drawing Sheets

(56) References Cited

FOREIGN PATENT DOCUMENTS

| | | |
|---|---|---|
| KR | 10-2010-0134407 A | 12/2010 |
| KR | 10-2009-0058086 A | 3/2011 |
| KR | 10-2011-0064156 A | 6/2011 |
| WO | WO-2008/023894 A1 | 2/2008 |
| WO | WO-2010/129454 A1 | 11/2010 |

OTHER PUBLICATIONS

European Search Report dated Nov. 2, 2015 in European Application No. 12831368.1.
Office Action dated Apr. 1, 2016 in Chinese Application No. 201280045184.2.

* cited by examiner

CAMERA MODULE HAVING A HOUSING WITH A METAL LAYER

CROSS-REFERENCE TO RELATED APPLICATIONS

This applicaton is the U.S. national stage application of International Patent Application No. PCT/KR2012/007357, filed Sep. 14, 2012, which claims priority to Korean Application No. 10-2011-0093581, filed Sept. 16, 2011, the disclosures of each of which are incorporated herein by reference in their entirety.

TECHNICAL FIELD

The teachings in accordance with exemplary embodiments of this invention relate generally to a camera module.

BACKGROUND ART

Generally, an optical device includes a lens transfer device moving a lens to an optical direction, where the lens transfer device uses an actuator such as an electro-magnetic motor or a piezoelectric actuator as a means for generating a power. A cam or a screw is used as a means for transmitting power generated by the actuator.

Thus, the lens transfer device uses the power generated by the actuator to adjust a focus by moving the lens to an optical direction, whereby auto-focusing function is realized.

Especially, in recent times, mobile terminals and PDAs (personal digital assistants) are largely and frequently mounted with a camera module. The camera module may be equipped with an AF (Auto Focusing) function, and a VCM (Voice Coil Motor) is used for auto focusing function, where the VCM performs the auto focusing function by vertically moving a lens within a predetermined size of space. In order to perform the AF function in the conventional camera module, a lens position is changed to focus on a particular object.

Meanwhile, the electromagnetic wave is in an invisible odorless thing like the air we breathe, and hangs around us to disturb other electromagnetic waves called EMI (Electromagnetic Interference) which in turn can interfere with the performance of various sensitive wireless devices nearby, causing industrial damages, and resulting in fatal influences directly or indirectly on human body.

Particularly, a camera module is mounted on portable terminals, notebooks and other electronic devices generating electromagnetic wave, which may result in erroneous operation of the electronic devices, such that multi-angled researches and technical developments are being waged to reduce the electromagnetic wave.

DISCLOSURE OF INVENTION

Technical Problem

Accordingly, the present invention has been made keeping in mind the above disadvantages/problems occurring in the prior art, and the present invention provides a camera module configured to minimize or shield the EMI and to simplify constituent parts in the camera module.

Technical problems to be solved by the present invention are not restricted to the above-mentioned, and any other technical problems not mentioned so far will be clearly appreciated from the following description by skilled in the art.

Solution to Problem

In order to solve these problems, the present invention provides a camera module, the camera module comprising: a PCB (Printed Circuit Board) mounted with an image sensor; a housing configured to protect the image sensor and mounted therein with camera constituent parts; and plural pieces of lenses mounted on the housing, wherein surface of the housing is metalized.

In some exemplary embodiments, the camera module may further comprise an auto focusing device focusing an image inputted to the image sensor through the plural sheets of lenses.

In some exemplary embodiments, the housing may be formed with electrode lines realized by a surface electrode forming technology.

In some exemplary embodiments, the surface electrode forming technology may be an MID (Molded Interconnect Device) process.

In some exemplary embodiments, the auto focusing device may be one of an MEMS (micro electro mechanical system) actuator, a VCM (Voice Coil Motor), an SMA (Shape Memory Alloy) actuator and a piezoelectric element actuator.

In some exemplary embodiments, the electrode line may be electrically connected to the actuator.

In some exemplary embodiments, the metalized housing surface may be spaced apart from the electrode line at a predetermined distance.

In some exemplary embodiments, the housing may include at least one or more impurities, and may be injection-molded with a material that is physically deformed, in a case at least one of light and heat is applied thereto.

In some exemplary embodiments, the electrode line may be an area exposed to light from the housing in which a physical substance is changed to a conductible state.

In some exemplary embodiments, the electrode line may be a plated layer plated on the exposed area of the housing.

In some exemplary embodiments, the light exposing the exposed area may be laser beam.

In some exemplary embodiments, the electrode line may be formed on any one of an external surface of the housing, an inner surface of the housing or both the external and inner surfaces of the housing.

In some exemplary embodiments, the constituent parts may be parts for FF (Fixed Focus) obtaining an image of an object using a fixed focusing method.

In some exemplary embodiments, the FF parts may include a lens barrel embedded with lenses, a holder screwed to the lens barrel, an image sensor converting an optical image inputted through the lenses to an electrical signal, and a PCB (Printed Circuit Board) mounted with the image sensor.

In some exemplary embodiments, the constituent parts may be parts for AF (Auto Focusing) obtaining an image of an object using an auto focusing method.

In some exemplary embodiments, the AF parts may include a lens barrel including a plurality of lenses receiving an optical image of the object, an actuator moving the lens barrel for auto focusing, and a PCB (Printed Circuit Board) mounted with an image sensor converting an optical image inputted through the lenses to an electrical signal.

In some exemplary embodiments, the constituent parts may be parts configured to flash on an object.

Advantageous Effects of Invention

A camera module according to the present invention has an advantageous effect in that an external surface of a housing is metalized to shield an EMI and an electrode line is formed along the shape of the housing as well, whereby there is no need of mounting additional parts for complicated wiring, a can assembly process can be dispensed with, a connecting process such as soldering that may cause a thermal deformation can be dispensed with to reduce the manufacturing cost, reliability against drop can be improved by reduced weight, and a lens having a large diameter can be mounted at an external space of the camera module used to be occupied by the can.

Another advantageous effect is that an electrode line can be formed along the shape of a housing to enable an integral injection molding of the housing with parts that can be embedded inside the housing, whereby the number of parts can be reduced for simplification to reduce the manufacturing cost and to simplify the assembly process of the parts.

BRIEF DESCRIPTION OF DRAWINGS

The teachings of the present invention can be readily understood by considering the following detailed description in conjunction with the accompanying drawings, in which.

BEST MODE FOR CARRYING OUT THE INVENTION

Hereinafter, exemplary embodiments of the present invention will be described in detail with reference to the accompanying drawings.

In describing the present disclosure, detailed descriptions of constructions or processes known in the art may be omitted to avoid obscuring appreciation of the invention by a person of ordinary skill in the art with unnecessary detail regarding such known constructions and functions. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Furthermore, directional terminology, such as "top," "bottom," "front," "back," etc., may be used with reference to the orientation of the Figures being described. Because components of embodiments may be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
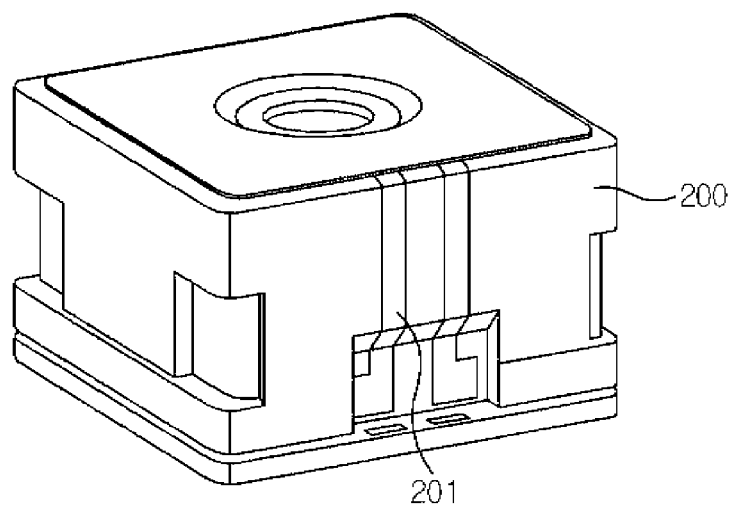
FIG. 1 is a schematic perspective view illustrating a camera module having an EMI shielding function according to an exemplary embodiment of the present invention.
Figure 2:
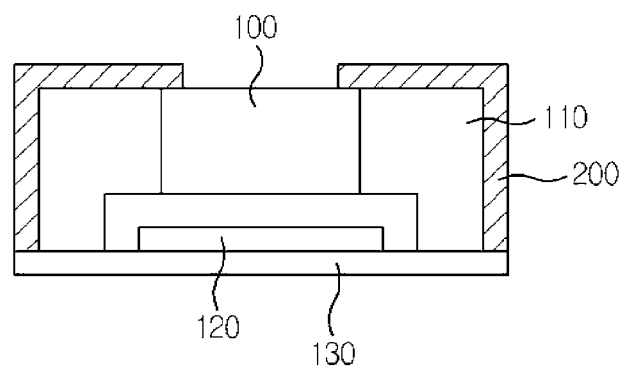
FIG. 2 is a mimetic cross-sectional view illustrating a camera module having an EMI shielding function according to an exemplary embodiment of the present invention.

FIG. 1 is a schematic perspective view illustrating a camera module having an EMI function according to an exemplary embodiment of the present invention, and FIG. 2 is a mimetic cross-sectional view illustrating a camera module having an EMI function according to an exemplary embodiment of the present invention.

The camera module having an EMI shielding function according to an exemplary embodiment of the present invention provides a technology capable of effectively shielding an EMI (Electromagnetic Interference) from an external housing of the camera module.

Referring to FIG. 1, the camera module includes constituent parts configured to photograph an object, and a metalized housing formed on an external surface of the camera module and embedded with the constituent parts.

To be more specific, the camera module includes a PCB (Printed Circuit Board) mounted with an image sensor; a housing (200) configured to protect the image sensor and mounted therein with camera constituent parts; and plural pieces of lenses mounted on the housing, wherein a surface of the housing is metalized. The camera module may further comprise an auto focusing device focusing an image inputted to the image sensor through the plural sheets of lenses.

Furthermore, the housing may be formed with electrode lines (201) realized by a surface electrode forming technology, where the surface electrode forming technology may be an MID (Molded Interconnect Device) technology.

Still furthermore, the auto focusing device may be one of an MEMS (micro electro mechanical system) actuator, a VCM (Voice Coil Motor), an SMA (Shape Memory Alloy) actuator and a piezoelectric element actuator. The housing (200) is preferably a plastic housing, and may be formed with the electrode lines (201) realized by the surface electrode forming technology. The surface electrode forming technology may be an MID (Molded Interconnect Device) technology, where the electrode lines (201), which are current-flowing paths, may be called conductive lines.

The electrode lines are electrically connected to the constituent parts to be applied with voltages and a control signal for driving the camera module, or to transmit an electric signal to an image of an object photographed by the camera module.

The MID technique is widely used in various electronic devices to hollow packages. That is, the MID technique is such that a light-exposed area is changed in physical properties to become electrode lines, or a plated layer is formed on the physical property-changed area to allow the electrode lines to be formed along the shape of the housing (200).

Furthermore, the parts may be parts for FF (Fixed Focus) configured to obtain an image of an object using a fixed focusing method, or parts for AF (Auto Focus) configured to obtain an image of an object using an auto focusing method. At the same time, the parts may be parts configured to shine a flashlight on an object, e.g., various parts (PCBs, electrical connectors) including elements for flashlight, and/or elements for driving flashlight. The housing (200) may further include a separate receptor and a window for flashlight, where an optical element and a PCB may be contained inside the receptor, and the window functions to allow light emitted from the flashlight element to pass therethrough and to illuminate the object. The optical element may include one of a light-emitting chip embedded package, a light-emitting chip embedded module, and a PCB mounted with a light-emitting chip.

The optical element may include an LED (Light Emitting Diode) element, where the LED element is characterized by advantages of high efficiency, speedy response, long life, miniaturization, lightness and reduced energy consumption caused by low power consumption, and by an advantage as an green (environment-friendly) light source with no generation of monoxide and mercury, and with easy waste disposal. The small-sized LED element having a high luminance character is adequate for flashlight illumination.

Thus, the camera module according to an exemplary embodiment of the present invention is advantageous in that a flashlight illuminating function can be added to dispense with a separate illumination device, whereby a bright photographing is possible even in the night.

Furthermore, the FF parts may include a lens barrel embedded with lenses, a holder screwed to the lens barrel, an image sensor converting an optical image inputted through the lenses to an electrical signal, and a PCB (Printed Circuit Board) mounted with the image sensor.

Referring to FIG. 2, the AF parts include a lens barrel (100) including a plurality of lenses receiving an optical image of the object, an actuator (110) moving the lens barrel for auto focusing, and a PCB (Printed Circuit Board, 130) mounted at a bottom surface of the lens barrel (100) with an image sensor (120) converting an optical image inputted through the lenses to an electrical signal.

The electrode lines (201) formed on the housing (200) by way of MID technology are electrically connected to the actuator (110) and supplied with voltages for driving the actuator (110). The actuator (110) may be one of an MEMS (micro electro mechanical system) actuator, a VCM (Voice Coil Motor), an SMA (Shape Memory Alloy) actuator and a piezoelectric element actuator. The VCM may include a bobbin, a coil, a permanent magnet and a yoke.

The lens barrel (100) is formed at a periphery thereof with screw threads which are in turn screwed to those of the inner surface of the bobbin, where the bobbin is coupled to the lens barrel (100). The lens barrel (100) is wound at the periphery thereof by a coil to a direction perpendicular to a magnetic flux, where the coil interacts with the permanent magnet.

The lens barrel (100), serving as a means to fix and protect a plurality of lenses, is sequentially stacked at an inner surface thereof with the plurality of lenses along an axial direction, where the plurality of lenses is capable of receiving an optical image of an object. The yoke functions to prevent a magnetic field formed between the coil and the permanent magnet from being discharged outside.

In a case a voltage is applied to the coil, a current flowing in the coil and the magnetic field of the permanent magnet interacts according to Fleming's left-hand law, whereby the bobbin is applied with a force upwards of the optical direction. At this time, a distance moved upwards along the optical direction by the lens barrel and the bobbin increases as the intensity of current applied to the coil increases.

Mode for the Invention

Figure 3:
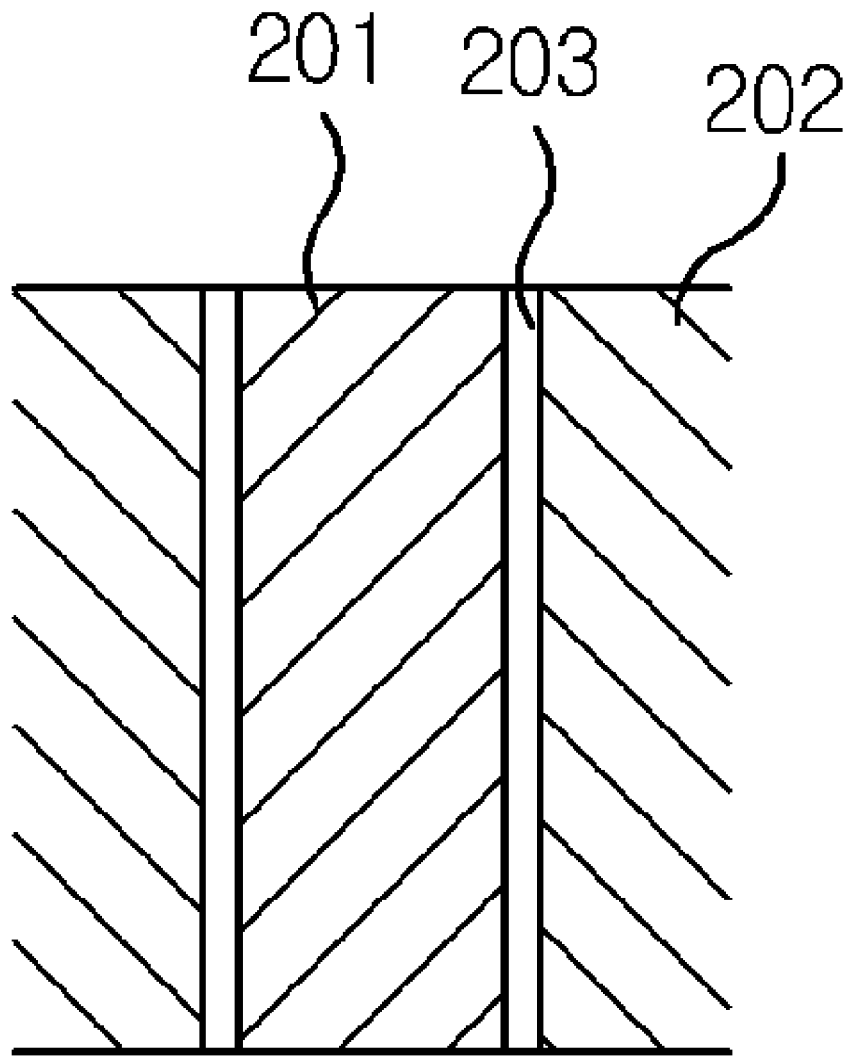
FIG. 3 is a mimetic view illustrating a state of an external surface of a housing in a camera module according to an exemplary embodiment of the present invention.

FIG. 3 is a mimetic view illustrating a state of an external surface at a housing in a camera module according to an exemplary embodiment of the present invention As described above, the external surface of the housing at the camera module is metalized. The metalized external surface serves to shield the EMI transmitted from outside and simultaneously prevent EMI generated from constituent parts embedded in the camera module from being discharged outside.

Thus, the camera module according to an exemplary embodiment of the present invention is advantageous in that the external surface of the housing at the camera module is metalized to effectively shield the EMI to enable a dispensation with a separate part such as a metal can.

The housing of the camera module is formed with electrode lines (201) realized by the MID technology, for being electrically connected to constituent parts inside the camera module. Referring to FIG. 3, the electrode lines (201) should not be electrically connected to the metalized surface (202). If the electrode lines (201) are electrically connected to the metalized surface (202), the electrode lines (201) and the metalized surface (202) are short-circuited. Thus, the metalized surface (202) is spaced apart from the electrode lines (201) at a predetermined distance, and a non-metalized housing (203) is exposed between the metalized surface (202) and the electrode lines (201).

Figure 4:
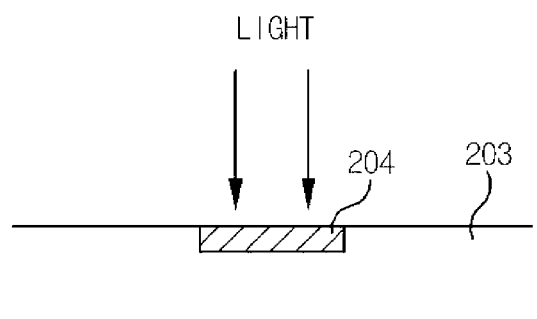
FIG. 4 is a schematic cross-sectional view illustrating a method forming an electrode pattern on a housing using MID process according to an exemplary embodiment of the present invention.
Figure 5:
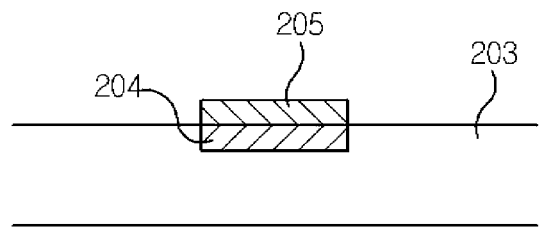
FIG. 5 is a schematic cross-sectional view illustrating another method forming an electrode pattern on a housing using MID process according to an exemplary embodiment of the present invention.

FIG. 4 is a schematic cross-sectional view illustrating a method forming an electrode pattern on a housing using MID process according to an exemplary embodiment of the present invention, and FIG. 5 is a schematic cross-sectional view illustrating another method forming an electrode pattern on a housing using MID process according to an exemplary embodiment of the present invention.

The MID technology, which is a technology capable of forming electrode lines along the shape of the housing, can simplify electrical wirings and constituent parts. For a non-limiting example, an MEMS actuator barrel may be integrally injection-molded with an external housing to allow the electrical wirings to be wired freely and three-dimensionally along the shape of an integrally molded article using the MID technology.

Furthermore, the housing (203) of the camera module includes at least one or more impurities, and may be preferably injection-molded with a material whose physical properties are changed, in a case at least one or more of light and heat is applied thereto.

That is, as shown in FIG. 4, the housing (203) injection-molded with a material containing impurities is changed in physical properties at a predetermined area (204) where light is irradiated. That is, the impurities contained in the predetermined area (204) of the exposed housing (203) is evaporated or sublimated by receiving an optical energy to change materials in the impurities-existent housing (203). At this time, the impurities may change the physical properties of the light-exposed predetermined area (204) of the housing (203) to a conductive state, or change the light-exposed predetermined area (204) to that of physical properties easy to be plated or coated, albeit being non-conductible.

Thus, the light-exposed predetermined area (204) of the housing (203) in FIG. 4 is an area for electrode lines or an area easy to be plated or coated. In case the light-exposed predetermined area (204) of the housing (203) in FIG. 4 is an area that is easily plated or coated, a conductive plated layer (205) may be formed on the predetermined area (204) to thereby realize electrode lines, as illustrated in FIG. 5.

Furthermore, the light exposure for forming the electrode lines on the housing (203) may be selectively performed using a mask. At this time, the light is preferably laser beam. The electrode lines may be formed on any one of an external surface of the housing (203), an inner surface of the housing, or both the external and inner surfaces of the housing (203).

As apparent from the foregoing, the camera module according to the present invention has an advantageous effect in that an external surface of a housing is metalized to shield an EMI and electrode lines are formed along the shape of the housing as well, whereby there is no need of mounting additional parts for complicated wiring, a can assembly process can be dispensed with, a connecting process such as soldering that may cause a thermal deformation can be dispensed with to reduce the manufacturing cost, reliability against drop can be improved by reduced weight, and a lens having a large diameter can be mounted at an external space of the camera module used to be occupied by the can.

Another advantageous effect is that an electrode line can be formed along the shape of a housing to enable an integral injection molding of the housing with parts that can be embedded inside the housing, whereby the number of parts can be reduced for simplification to reduce the manufacturing cost and to simplify the assembly process of the parts.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

Exemplary embodiments of the camera module according to the present invention have an industrial applicability in that an external surface of a housing is metalized to shield the EMI and an electrode line is formed along the shape of the housing.

The invention claimed is:

1. A camera module comprising:
a Printed Circuit Board (PCB) mounted with an image sensor;
a housing disposed at the Printed Circuit Board and accommodating constituent parts of the camera module;
at least one lens disposed at an inner side of the housing;
an auto focusing device focusing an image inputted to the image sensor through the lens;
a metal layer formed along an outer surface of the housing; and
an electrode line formed along the outer surface of the housing,
wherein the electrode line is electrically connected with the PCB and the auto focusing device,
wherein the electrode line is electrically insulated from the metal layer;
wherein the housing includes a recess part inwardly recessed from the outer surface of the housing, and a taper part inclinedly connected with the recess part and the outer surface of the housing;
wherein the electrode line is extended along an outer surface of the recess part and the taper part, and
wherein the outer surface of the recess part is disposed further inward than a terminal of the PCB.

2. The camera module of claim 1, wherein the electrode line is formed by a surface electrode forming technology.

3. The camera module of claim 2, wherein the surface electrode forming technology is an MID (Molded Interconnect Device) process.

4. The camera module of claim 1, wherein the auto focusing device is one of an MEMS (micro electro mechanical system) actuator, a VCM (Voice Coil Motor), an SMA (Shape Memory Alloy) actuator and a piezoelectric element actuator.

5. The camera module of claim 2, wherein the metal layer is spaced apart from the electrode line at a predetermined distance.

6. The camera module of claim 2, wherein the housing includes at least one impurity, and
wherein the housing is formed with a material that is physically changed by the impurity, in a case at least one of light and heat is applied thereto.

7. The camera module of claim 6, wherein the electrode line is an exposed area of the housing exposed to light, and physical properties of the exposed area are changed to a conductive state by the impurity.

8. The camera module of claim 6, wherein the electrode line is a plated layer plated on an exposed area of the housing.

9. The camera module of claim 7, wherein the light exposing the exposed area is laser beam.

10. The camera module of claim 1, wherein the constituent parts are parts for Fixed Focus (FF) obtaining an image of an object using a fixed focusing method.

11. The camera module of claim 10, wherein the Fixed Focus (FF) parts include a lens barrel embedded with lenses, a holder screwed to the lens barrel, an image sensor converting an optical image inputted through the lenses to an electrical signal, and a PCB (Printed Circuit Board) mounted with the image sensor.

12. The camera module of claim 1, wherein the constituent parts are parts for AF (Auto Focusing) obtaining an image of an object using an auto focusing method.

13. The camera module of claim 12, wherein the AF parts include a lens barrel including a plurality of lenses receiving an optical image of the object, an actuator moving the lens barrel for auto focusing, and a PCB (Printed Circuit Board) mounted with an image sensor converting an optical image inputted through the lenses to an electrical signal.

14. The camera module of claim 1, wherein the constituent parts are parts configured to shine a flashlight on an object.

* * * * *